United States Patent [19]
Hadden et al.

[11] Patent Number: 5,578,972
[45] Date of Patent: Nov. 26, 1996

[54] TRANSMIT/RECEIVE ISOLATION ASSEMBLY FOR A VERY SMALL APERTURE SATELLITE TERMINAL

[75] Inventors: Ian Hadden, Ellicott City; Robert Hannah, Germantown, both of Md.

[73] Assignee: Hughes Aircraft, Los Angeles, Calif.

[21] Appl. No.: 405,689

[22] Filed: Mar. 17, 1995

[51] Int. Cl.⁶ ............................................... H01P 1/23
[52] U.S. Cl. ................................. 333/135; 333/21 A
[58] Field of Search ............................. 333/21 A, 126, 333/135; 29/600

[56] References Cited

U.S. PATENT DOCUMENTS

| | | | |
|---|---|---|---|
| 4,653,568 | 3/1987 | Baldelli | 164/155.5 X |
| 4,920,351 | 4/1990 | Bartlett et al. | 333/126 X |
| 5,243,306 | 9/1993 | Minowa et al. | 333/135 |
| 5,276,456 | 1/1994 | Kim | 333/126 X |
| 5,291,650 | 3/1994 | Carvalho et al. | 29/600 |

Primary Examiner—Paul Gensler
Attorney, Agent, or Firm—John T. Whelan; Wanda K. Denson-Low

[57] ABSTRACT

An apparatus for coupling a receiver and a transmitter to a single antenna via a feedhorn so as to allow for the simultaneous transmission and reception of signals. The apparatus is an integrally formed single unit which includes a polarizer, a circular waveguide section, a transmitter waveguide section, and a receiver waveguide section. The polarizer has a first, second and third port and is operative to separate and combine a first and second signal which are orthogonally polarized. The circular waveguide section has a first port formed integral with the first port of the polarizer and a second port for coupling to the antenna via a feedhorn. The circular waveguide section is operative for transmitting or receiving the first and second signals. The transmitter waveguide section has a first port formed integral with the second port of the polarizer, and a second port for coupling to the transmitter. The receiver waveguide section has a first port formed integral with the third port of the polarizer, and a second port for coupling to the receiver.

13 Claims, 3 Drawing Sheets

TRANSMIT/RECEIVE ISOLATION ASSEMBLY FOR A VERY SMALL APERTURE SATELLITE TERMINAL

BACKGROUND OF THE INVENTION

Satellite communication systems typically have employed large aperture antennas and high power transmitters for establishing an uplink to the satellite. Recently, however, very small aperture antenna ground terminals, referred to as remote ground terminals, have been developed for data transmission at low rates. In such systems, the remote ground terminals are utilized for communicating via a satellite for a remote location to a central hub station. The central hub station communicates with multiple remote ground terminals, and has a significantly larger antenna, as well as a significantly larger power output capability than any of the remote ground terminals.

Very small aperture terminal (VSAT) remote terminals can be used to communicate data, voice and video, to or from a remote site to a central hub. Typically, the VSAT remote terminals have a small aperture directional antenna for receiving from or transmitting signals to a satellite, and an outdoor unit (ODU) mounted near the antenna for transmitting a modulated carrier generated by an indoor unit (ZDU). The ZDU demodulates incoming signals received from the ODU and also operates as an interface between a user's communication equipment and the ODU.

The outdoor unit functions in part as an interface between the indoor unit and the antenna. As such, it contains a transmitter chain for transmitting the modulated carrier signal and a receiver chain for coupling signals received via the antenna to the indoor unit. The outdoor unit further comprises a coupling apparatus, for example, a duplexer, which allows the transmitter chain and the receiver chain to be coupled to a single antenna.

Other coupling apparatus heretofore utilized contained various combinations of individual components, including multiple filters and transducers, coupled together as required to perform the necessary task of separating the signals to be transmitted from the received signals. Such separate components often require additional transitions and transformers in order to couple the outdoor unit with the antenna via a feedhorn. Such additional transitions and transformers operate to reduce the transmission capabilities of the outdoor unit by increasing insertion losses and other related factors. Further, the separate components were often located inside the outdoor unit and therefore were not readily field replaceable or readily upgraded once installed.

Accordingly, as the viability of the remote ground terminal concept increases as the cost for providing a remote ground terminal at the remote location decreases, it is necessary to decrease the cost of all components of the remote ground terminal as much as possible. As such, there exists a need for a coupling apparatus which is a single integrated unit which does not require a plurality of individual components or additional transitions and transformers to be utilized to interface the coupling apparatus with either the outdoor unit or the antenna. Further, the coupling apparatus should be readily removable from the outdoor unit so as allow, for example, the transmitter chain to be upgraded so as to provide an increase in transmission capabilities.

SUMMARY OF THE INVENTION

The present invention provides an apparatus for coupling a receiver and transmitter in an outdoor unit of a remote ground terminal to an antenna, which is designed to satisfy the aforementioned needs. The present invention provides a novel design for a coupling apparatus which does not comprise a plurality of individual components, and which eliminates the need for additional transitions or transformers to interface the coupling apparatus with the outdoor unit or the antenna.

Accordingly, the present invention relates to an apparatus for coupling a receiver and a transmitter to a single antenna so as to allow for the simultaneous transmission and reception of signals. In one embodiment, the apparatus comprises a polarizer having a first, second and third port, the polarizer being operative to separate and combine a first and second signal which are orthogonally polarized; a circular waveguide section having a first port formed integral with the first port of the polarizer, and a second port for coupling to the antenna via a feedhorn, the circular waveguide section operative for transmitting or receiving the first and second signals; a transmitter waveguide section having a first port formed integral with the second port of the polarizer, and a second port for coupling to the transmitter; and a receiver waveguide section having a first port formed integral with the third port of the polarizer, and a second port for coupling to the receiver. In accordance with the present invention, the polarizer, the circular waveguide section, the transmitter waveguide section and the receiver waveguide section are integrally formed as a single unit.

As described below, the apparatus of the present invention provides important advantages. For example, the present invention provides an integral, self contained assembly, hereafter referred to as the transmit/receive isolation assembly ("TRIA"), which affords a high level of filtering and isolation between the transmitter chain and receiver chain of the outdoor unit. The use of a single integrated assembly minimizes the power losses associated with coupling signals between the outdoor unit and the antenna, and therefore maximizes the transmission capability of the outdoor unit.

Further, the present invention provides a small compact module which is readily removable from the outdoor unit so that various modifications can be performed easily by field technicians. The TRIA module of the present invention also provides coupling to the outdoor unit by a standard WR-75 waveguide interface.

The invention itself, together with further objects and attendant advantages, will best be understood by reference to the following detailed description, taken in conjunction with the accompanying drawings.

DETAILED DESCRIPTION OF THE DRAWINGS

Figure 1:
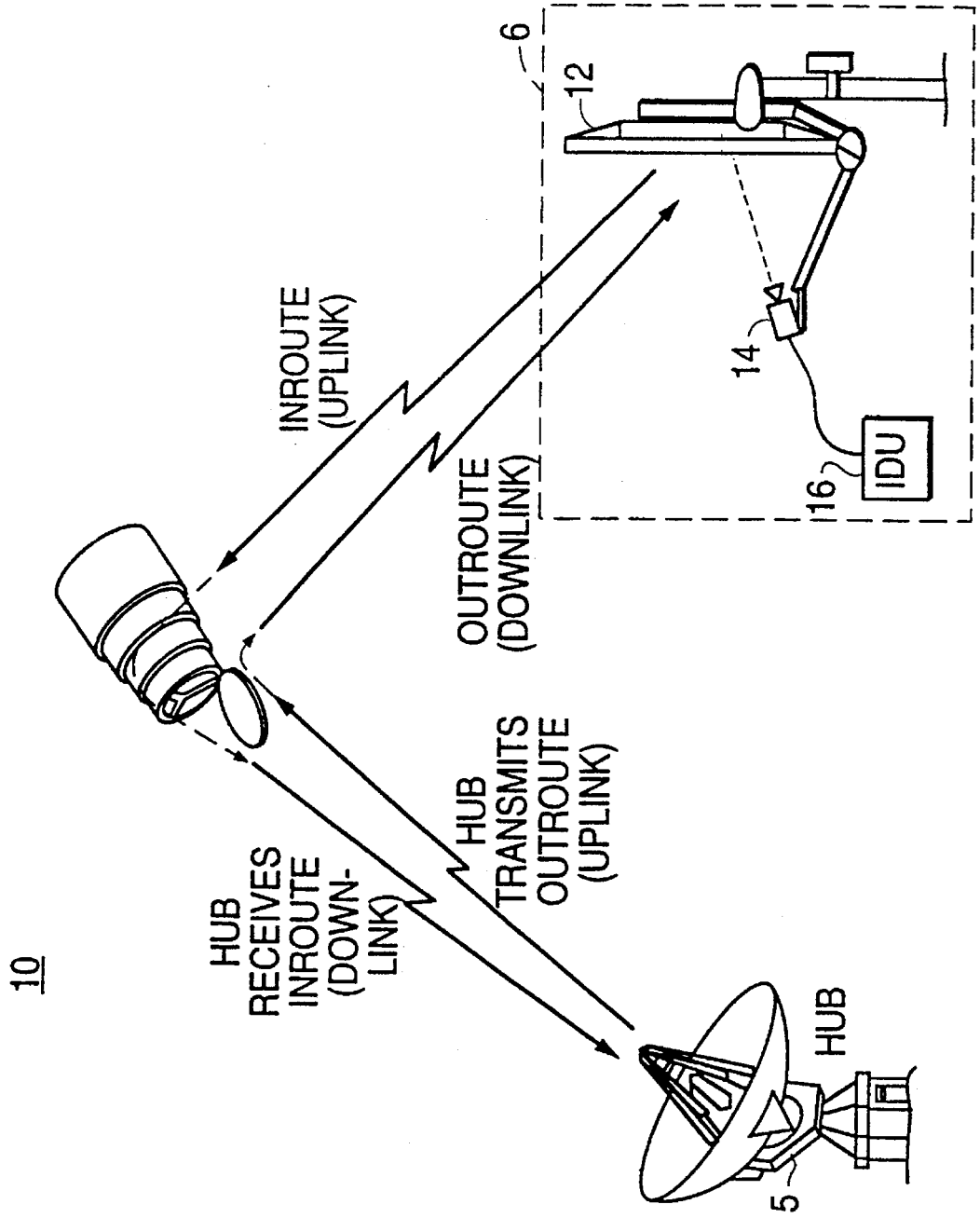
FIG. 1 is a block diagram of a very small aperture terminal ("VSAT") satellite communication network which utilizes the present invention.

The VSAT satellite communication network 10 illustrated in FIG. 1, comprises a central hub station 5, a communication satellite 7, and a plurality of remote ground terminals 6

(only one is shown). The VSAT network 10 functions as a two way transmission system for transferring data and voice communications between the central hub station 5 and the numerous remote ground terminals 6. All data is transferred between the central hub station 5 and the remote ground terminals 6 via transponders located in the satellite 7. Signals transmitted from the central hub station 5 to the remote ground terminal 6 are referred to as "outroute", while signals transmitted in the opposite direction are referred to as "inroute".

As shown in FIG. 1, the communication satellite 7 functions as a microwave relay. It receives signals from both the central hub station 5 and the remote ground terminals 6 at a first frequency and then retransmits the signals at a second frequency. The satellite 7 comprises a transponder which receives, amplifies and retransmits each signal within a predefined bandwidth. The transponders of the VSAT network 10 shown in FIG. 1 can operate in various frequency bands, for example, Ku and C band.

The remote ground terminal 6 comprises a small aperture antenna 12 for receiving (i.e., downlink) and transmitting (i.e., uplink) signals, an outdoor unit 14 typically mounted proximate the antenna 12 and an indoor unit 16 which operates as an interface between a specific user's communication equipment and the outdoor unit 14. The outdoor unit 14 comprises a transmitter chain for amplifying and frequency multiplying a modulated data signal, and a receiver chain for receiving and demodulating "outroute" signals. The transmitter chain and the receiver chain are coupled to the antenna 12 by a TRIA module 26 (see FIG. 2) via a feedhorn, which is mounted on the outside of the outdoor unit 14.

Figure 2:
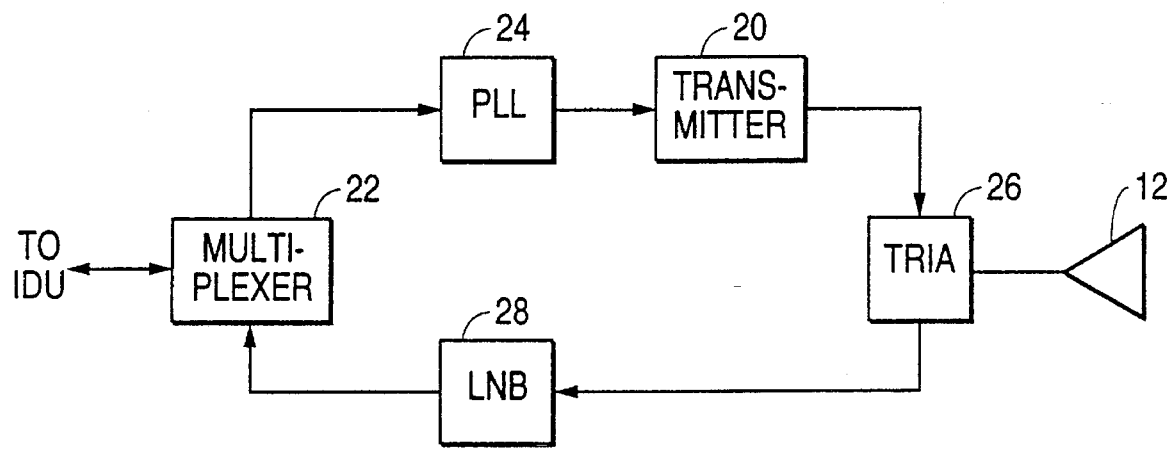
FIG. 2 is a schematic diagram illustrating one embodiment of the outdoor unit of the present invention.

FIG. 2 is a schematic diagram of the outdoor unit 14 of the present invention. A shown in FIG. 2, the outdoor unit 14 of the present invention includes a transmission chain comprising a multiplexer 22 for receiving the modulated data signal from the indoor unit 16, a phase lock loop ("PLL") 24 for frequency stabilizing and multiplying the modulated data signal, and a transmitter module 20 for amplifying and frequency multiplying the modulated data signal to generate a modulated carrier signal. The output of the transmitter chain is coupled to the TRIA module 26 which couples the output of the transmitter module 20 to the antenna 12 via a feedhorn.

The outdoor unit 14 also comprises a receiver chain for receiving the downlink signal from the satellite 7. The receiver chain comprises a low noise block downconverter 28 which transforms the received signal into a corresponding intermediate frequency signal. This signal is then coupled to the indoor unit 16, where it is further demodulated so as recreate the transmitted data. As shown in FIG. 2, the TRIA module 26 also functions to couple the antenna 12 to the input of the receiver chain.

As stated, the TRIA module 26 of the present invention functions to couple the transmitter chain and the receiver chain with the antenna 12 via a feedhorn so as to allow for the simultaneous transmission and reception of signals to and from the central hub station 5. The TRIA module 26 is a single integrally formed unit which comprises essentially three waveguide sections 30, 32, 34 and a polarizer 36.

Figure 3:
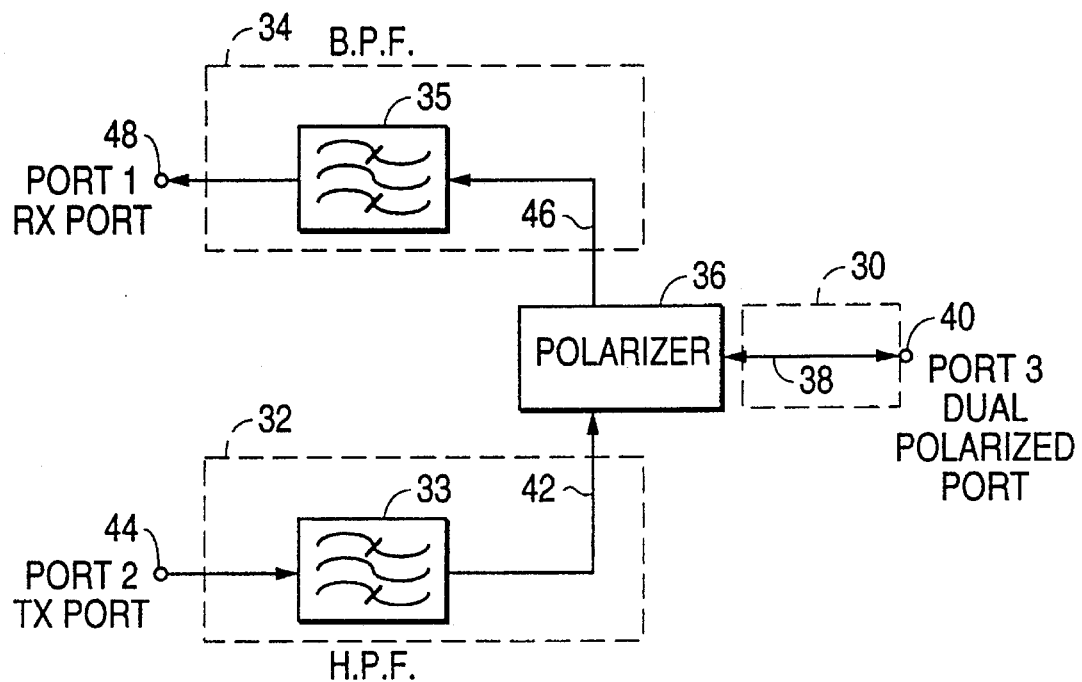
FIG. 3 is a block diagram illustrating the components of one embodiment of the TRIA module of the present invention.

Referring to FIG. 3, which is a block diagram of one embodiment of the TRIA module 26 of the present invention, the three waveguide sections 30, 32, 34 are hereafter referred to as the circular waveguide section 30, the transmitter waveguide section 32 and the receiver waveguide section 34. The circular waveguide section 30 comprises a first port 38 formed integral with a first port of the polarizer 36, and a second port 40 which is coupled to the antenna 12 via a feedhorn during operation. The circular waveguide section 30 functions to transmit or receive both vertically and horizontally polarized signals between the polarizer 36 and the antenna 12.

The transmitter waveguide section 32 comprises a first port 42 formed integral with a second port of the polarizer 36, and a second port 44 which is coupled to the output of the transmitter chain of the outdoor unit 14 during operation. The transmitter waveguide section 32 functions in conjunction with the polarizer 36 and the circular waveguide section 30 to form a transmission line which couples the modulated carrier signal generated by the transmitter module 20 to the antenna 12.

The receiver waveguide section 34 comprises a first port 46 formed integral with a third port of the polarizer 36, and a second port 48 which is coupled to the input of the receiver chain of the outdoor unit 14 during operation. The receiver waveguide section 34 functions in conjunction with the polarizer 36 and the circular waveguide section 30 to form a receiver line which couples "outroute" signals incident on the antenna 12 to the receiver chain.

In accordance with the present invention, the transmitter chain of the outdoor unit 14 is designed so as produce modulated carrier signals having a linear polarization, while the receiver chain of the outdoor unit 14 is designed to receive signals having a linear polarization orthogonal to the polarization utilized by the transmitter chain. The transmitter and receiver waveguide sections 32, 34 are designed to transmit only signals having the same polarization as the transmitter chain and the receiver chain, respectively.

The polarizer 36 and the circular waveguide section 30 function as an orthomode transducer. Specifically, with regard to the transmission signal generated by the transmitter module 20, the polarizer 36 functions to couple the linearly polarized signal to the circular waveguide section 30, wherein the transmission signal coexists with any received signals. With regard to the received signals, the polarizer 36 functions to separate the orthogonally polarized transmission signal and received signal, and couple only the received signal to the receiver waveguide section 34.

Furthermore, as shown in FIG. 3, the transmitter waveguide section 32 comprises a high-pass filter 33 which is formed as an integral part of the transmitter waveguide section 32 (i.e., the waveguide functions as a high-pass filter). The high-pass filter 33 functions to attenuate any spurious signals generated by the transmitter module 20 which could interfere with normal operation of the receiver. The high-pass filter 33 is also designed such that the transmitted signal complies with regulatory authorities (e.g., CCIR, FCC) specifications for spurious signals.

Similarly, the receiver waveguide section 34 comprises a band-pass filter 35 so as to further ensure that any signals not within a predefined receiver bandwidth will be sufficiently attenuated in order to prevent possible interference. The band-pass filter is formed as an integral part of the receiver waveguide section 34.

Figure 4C:
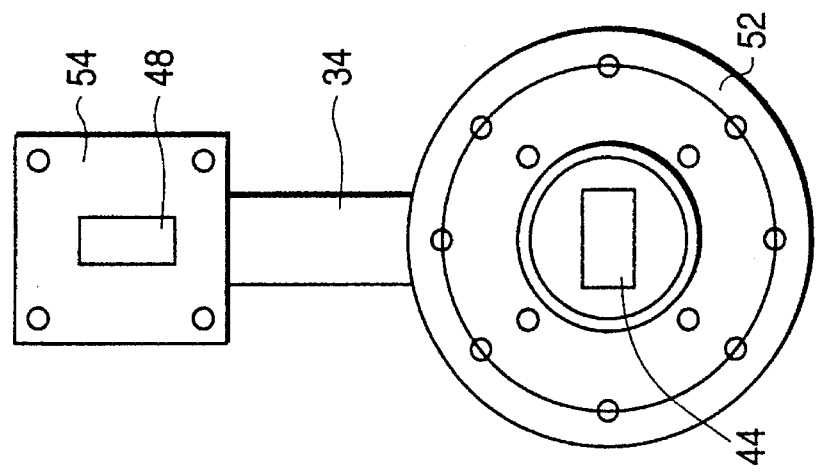
FIGS. 4(a)–4(c) are drawings illustrating the physical dimensions of one embodiment of the TRIA module shown in FIG. 3.
Figure 4B:
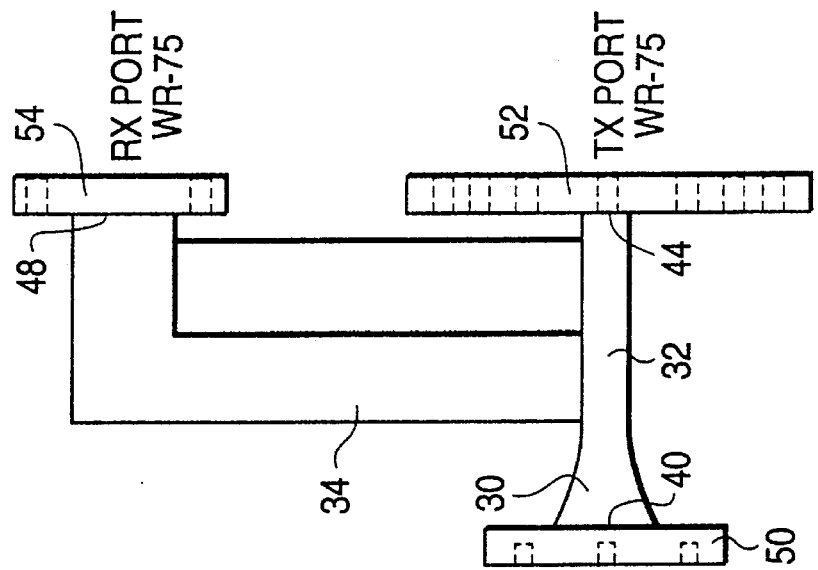
Figure 4A:
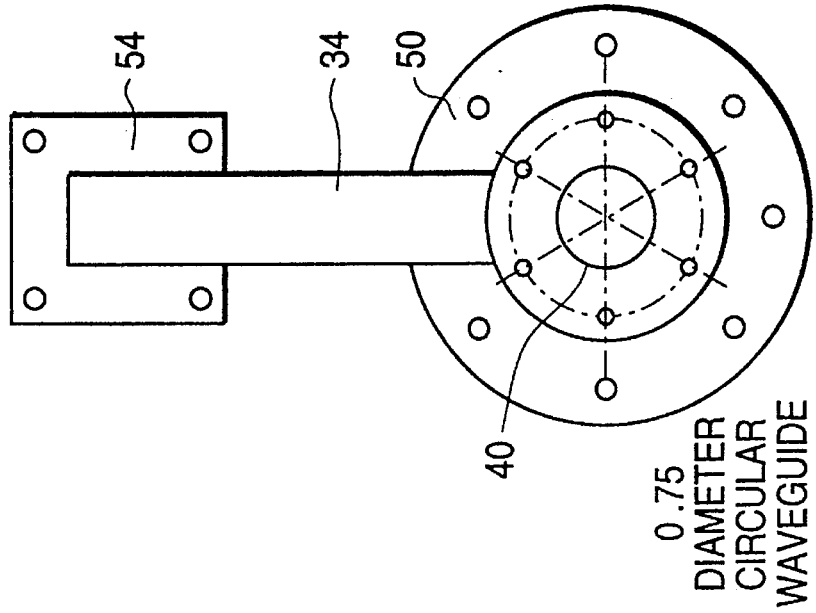

FIGS. 4(*a*)–4(*c*) are drawings illustrating the physical design of one embodiment of the TRIA module 26 shown in FIG. 3. As shown in FIGS. 4(*a*)–4(*c*), the second port 40 of the circular waveguide section 30 terminates at a connector 50 which is connected to the antenna 12 via a feedhorn during normal operation. The first port 38 of the circular waveguide section 30 is formed integral with a first port of the polarizer 36. The polarizer 36 is formed by the position and dimensions of the transmitter waveguide section 32 relative to the receiver waveguide section 34. The second port of the polarizer 36 is formed integral with the transmitter waveguide section 32, which in this embodiment is a rectangular waveguide having dimensions sufficient to transmit a linearly polarized signal at the predefined transmission frequency. The third port of the polarizer 36 is formed integral with the receiver waveguide section 34. As shown in the FIGS. 4(a)–4(c), the receiver waveguide section 34 comprises substantially the same dimensions as the transmitter waveguide section 32. However, the receiver waveguide section 34 is rotated 90 degrees relative to the transmitter waveguide section 32 such that the receiver waveguide section 34 only receives signals having a polarization which is linear and orthogonal to the polarization of the transmitter waveguide section 32.

Both the second port 44 of the transmitter waveguide section 32 and the second port 48 of the receiver waveguide section 34 are formed so as to provide standard WR-75 interfaces so that no additional transitions or transformers are required in order to interface with the TRIA module 26 of the present invention with the outdoor unit 14.

As is clear from FIG. 4(b), both the second port of the transmitter waveguide section 32 and the second port of the receiver waveguide section 34 further comprise a connector 52, 54 so as to allow the TRIA module 26 to be externally connected to the outdoor unit 14. As a result it is possible for a technician to remove a TRIA module 26 in the field so as to allow for various modifications of the equipment. For example, the addition of an external booster amplifier which provides for an increase in transmission capabilities.

In the preferred embodiment of the present invention, the dimensions of the three waveguide sections 30, 32, 34 and the polarizer 36 are selected such that the TRIA module 26 satisfies the following performance requirements. Specifically, the transmission line of the TRIA module 26 is characterized by, a frequency of operation of 14.00 Ghz to 14.50 Ghz, a VSWR at the input port 44 of less than or equal to 1.3:1, a return loss of less than or equal to −17.7 db, an insertion loss of less than or equal to 0.4 db, and a cross polarization between orthogonal axis of greater than or equal to 35.0 db. Further, the high-pass filter 33 of the transmitter waveguide section 32 attenuates signals within the range of 0 Ghz to 12.75 Ghz a minimum of 60 db.

The receiver line of the TRIA module 26 is characterized by, a frequency of operation of 10.95 Ghz to 12.75 Ghz, a VSWR of less than or equal to 1.3:1, a return loss of less than or equal to −17.7 db, an insertion loss of less than or equal to 0.3 db, and a cross polarization between orthogonal axis of greater than or equal to 35.0 db. Further, the band-pass filter 35 of the receiver waveguide section 34 attenuates signals within the frequency range of 0 hz to 7.0 Ghz a minimum of 30 db, and signals within the frequency range of 14.0 Ghz to 14.50 Ghz a minimum of 60 db.

The circular waveguide section 30 is characterized by a frequency of operation of 10.95 Ghz to 14.40 Ghz, as well as a VSWR of equal to or less than 1.3:1.

The TRIA module of the present invention provides numerous advantages. For example, the present invention provides an integral, self contained assembly which affords a high level of filtering and isolation between the transmitter chain and receiver chain of the outdoor unit. Further, the present invention provides a small compact unit which is readily removable from the outdoor unit so that modifications can be performed easily by field technicians. The invention also provides coupling to the outdoor unit by a standard WR-75 waveguide interface.

Another advantage is that the TRIA module of the present invention is capable of covering all the currently used VSAT international receive frequency bands without the need for tuning or the replacement of parts.

Of course, it should be understood that a wide range of other changes and modifications can be made to the preferred embodiment described above. It is therefore intended that the foregoing detailed description be regarded as illustrative rather than limiting and that it be understood that it is the following claims, including all equivalents, which are intended to define the scope of the invention.

What is claimed:

1. An apparatus for coupling a receiver and a transmitter to a single antenna via a feedhorn so as to allow for the simultaneous transmission and reception of signals, said apparatus comprising:

a single integrally formed one-piece unit including, a polarizer having a first, second and third port, said polarizer operative for separating and combining a first and second signal which are orthogonally polarized;

a circular waveguide section having a first port formed integral with said first port of said polarizer, and a second port for coupling to said antenna, said circular waveguide operative for transmitting said first and second signals;

a transmitter waveguide section having a first port formed integral with said second port of said polarizer, and a second port for coupling to said transmitter; and a receiver waveguide section having a first port formed integral with said third port of said polarizer, and a second port for coupling to said receiver;

wherein said polarizer, said circular waveguide section, said transmitter waveguide section and said receiver waveguide section are integrally formed as a single unit.

2. The apparatus of claim 1, wherein said transmitter waveguide section transmits signals having a linear polarization, and said receiver waveguide section transmits signals having a linear polarization which is orthogonal to the polarization transmitted by said transmitter waveguide section.

3. The apparatus of claim 1, wherein said first port of said transmitter waveguide section, said polarizer and said circular waveguide section form a transmission line operative to couple a transmission signal generated by said transmitter to said antenna.

4. The apparatus of claim 3, wherein said transmission line has a operational frequency bandwidth of 14 Ghz to 14.50 Ghz.

5. The apparatus of claim 4, wherein said transmission line exhibits a VSWR of equal to or less than 1.3:1, a return loss of less than or equal to −17.7 db, an insertion loss of less than or equal to 0.4 db, and a cross polarization between orthogonal axis of greater than or equal to 35.0 db.

6. The apparatus of claim 5, wherein said transmission waveguide section further comprises a high-pass filter formed integral within said waveguide section, said high-pass filter operative to suppress spurious signals generated by said transmitter which are outside a predefined transmission bandwidth.

7. The apparatus of claim 6, wherein said high-pass filter attenuates signals within the frequency range of 0 Ghz to 12.75 Ghz a minimum of 60 db.

8. The apparatus of claim 1, wherein said first port of said receiver waveguide section, said polarizer and said circular waveguide section form a receiver line operative to couple a signal received by said antenna to said receiver.

9. The apparatus of claim 8, wherein said receiver line has a operational frequency bandwidth of 10.95 Ghz to 12.75 Ghz.

10. The apparatus of claim 8, wherein said receiver line exhibits a VSWR of equal to or less than 1.3:1, a return loss of less than or equal to −17.7 db, an insertion loss of less than or equal to 0.3 db, and a cross polarization between orthogonal axis of greater than or equal to 35.0 db.

11. The apparatus of claim 1, wherein said receiver waveguide section further comprises a band-pass filter formed integral within said waveguide section, said band-pass filter operative to attenuate signals outside a predefined receiver bandwidth.

12. The apparatus of claim 11, wherein said band-pass filter attenuates signals within the frequency range of 0 Ghz to 7.0 Ghz a minimum of 30 db, and signals within the frequency range of 14.0 Ghz to 14.50 Ghz a minimum of 60 db.

13. The apparatus of claim 1, wherein said second port of said transmitter waveguide section, and said second port of said receiver waveguide section form WR-75 interfaces.

* * * * *